Patented June 25, 1940

2,205,699

UNITED STATES PATENT OFFICE 2,205,699

PROCESS FOR PRODUCTION OF SYNTHETIC RUBBER

James Johnson Earshen, also known as Dimiter Ivanoff Ousheff, Buffalo, N. Y.

No Drawing. Application February 14, 1940, Serial No. 318,805

1 Claim. (Cl. 260—2)

This, my invention, relates to synthetic rubber and methods for its production, which is much superior to natural rubber, because it is much more oil proof, much stronger, and for the reason, that it is more capable of absorbing the different kinds of fillers, etc. My synthetic rubber, in its final form, can be used for any purpose in any industry which uses rubber in any form, and the cost price will be much less than the price of the natural rubber. This, my new invention,—Processes for production of synthetic rubber, has only a similarity in raw materials, to my first Patent No. 2,117,990 of May 17, 1938, which was for the production of thinner for different kinds of paints, lacquers and cellulose derivatives, and there are no other points in common between the two inventions, which cover totally and distinctly different products. The raw materials used in my synthetic rubber are of three (3) groups as follows:

First group (1) A.—The gases and distillation products, that are received from dry distillation in the absence of air, from the vegetable matters derived:

(a) From any kind of wood, derived from any kind of tree;

(b) From any kind of straw and stems derived from any kind of grass and plant life.

The vegetable matters derived from the above mentioned group, are used without any set proportion, and are put into apparatus, where they are heated by direct flame, or superheated steam, with pressure starting from normal and rising gradually, from 20 to 25 atmospheres, and with temperature rising gradually from 450° to 460° centigrade. This distillation process takes from ten to twelve hours.

Second group (2).—The gases and distillation products that are received from dry distillation in the absence of air, from the following:

(c) From fusel oil, which is the by-product from the alcohol manufacturing industry, by fermentation process, from different kinds of grain;

(d) From molasses which is a by-product from the sugar manufacturing industry;

(e) From the skins, or coverings from any kind of potatoes, and the coverings of any kind of grains, which are the by-products from the starch manufacturing industry.

All the above raw materials mentioned in the second group, are used in the proportion of 1:1 common mixture, and are put into the distillation apparatus where they are heated by direct flame, or superheated steam, with pressure starting from normal and rising gradually from 10 to 15 atmospheric pressure, and with temperature rising from 400° to 450° centigrade.

Third group (3) C.—The gases and distillation products, that are received from dry distillation in the absence of air, from the following:

(f) From the heavy mineral oils and the by-products from the petroleum industry;

(g) From the heavy and the light oils, which are the by-products from the turpentine oil manufacturing industry;

(h) From the heavy and the light oils, which are the by-products from the dry distillation of oak and any other kind of tree bearing wide leaves manufacturing industry;

(i) From old and waste lubricating oils, which are useless for any known purpose.

All the above raw materials mentioned in (f), (g) and (h) in the third group are used in the proportion respectively of 4:1:1 common mixture, and are put into the distillation apparatus where they are heated by direct flame, or superheated steam, with pressure starting from normal and rising gradually from 20 to 25 atmospheric pressure, and with temperature rising from 450° to 550° centigrade. The old and waste lubricating mineral oils may be used as the mineral oils of (f) above.

All gases and distillation products, from the three above mentioned groups, heated in the above apparatuses, are transferred to one common receiver, where they are mixed all together and receive the common temperature resulting from the heating, from 550° to 600° centigrade, and where they are under a pressure of 17 to 20 atmospheric pressure. From this receiver, this mixture of the above mentioned gases and distillation products, is transmitted into another receiver, where it is mixed with acetylene gas, which arrives in this receiver from a generator, from where the acetylene gas is pumped to the receiver. The acetylene gas is received from the chemical process between the calcium carbide and water in a generator. The water in the acetylene gas generator arrives automatically. The calcium hydride from the generator is automatically transferred to a separate receiver. All gases and distillation products, from the distillation apparatuses, are transmitted into the receiver, with special taps, or spigots for regulating the common pressure into the receiver, and any excess of pressure of the gases and distillation products, being returned through a special pipe to some one of the distillation apparatuses with lower pressure, and in this way we have one circle moving of the gases and distillation products. This moving circle of the gases and distillation products, continues from the beginning, to the end of the process.

The gases and the distillation products in the receiver, as heretofore mentioned, have a temperature from 550° to 600° centigrade and are under an atmospheric pressure of from 17 to 20 atmospheres, and with this same pressure and temperature are transferred into the receiver, when the acetylene gas arrives, to be mixed with the gases and distillation products already there. The acetylene gas is pumped into the receiver, until the pressure in the receiver rises from 23 to 25 atmospheric pressure, and the temperature remaining constant. All the gases and distillation products, mixed with the acetylene gas into the receiver, are transferred into another receiver, when the temperature is reduced from 400° to 295° centigrade, and this temperature will remain, until the end of the process. Here, in this latter receiver, this mixture of the above mentioned gases and distillation products, together with the acetylene gas, is in intimate contact with the mixture of the very fine powders of the metals of iron, copper, zinc, and nickel, which are the catalysts in the foregoing processes. All these gases and distillation products, after their contact with the catalyst matter,— the above metallic powders, are transferred from this latter receiver, into a condenser, from which all products which are not yet condensed, are transferred automatically into one other receiver, which receiver has double walls between which walls there is a circulation of cool water. Here in this receiver, some of the gases and distillation products, after their contact with the cool walls of the receiver, are condensed, and remain in liquid form in the same receiver, while the products which are not condensed, and which are still in gaseous form, are transferred again to the receiver which is for the gases and distillation products with the acetylene gas, and a new circle moving of the gases and distillation products is begun, and continues to the end of the processes, when all uncondensed products are changed almost completely from uncondensed to condensed form, and all condensed products will remain in their common receiver, which is with the double walls, where the condensed products gradually arrive. In this latter and final receiver, after that the above described processes are completely finished, will be found my general product, my synthetic rubber, together with new synthetic by-products, in liquid form. From this receiver, my synthetic rubber, is separated automatically from the other synthetic by-products, and is transferred into another receiver, where my synthetic rubber is in form of a very thick jelly, at temperature about from 90° to 95° C., and is charged into a stable, elastic form, at normal temperature. The new liquid by-products are separated one from another, with vacuum distillation, into one separate distillation apparatus, completely independent from the above mentioned processes.

It is believed that the distillation products, resulting from the various distillation processes, consists principally of ethers, esters, olefines and paraffines and that these products, or some of their members, act as catalysts in the polymerization of acetylene to benzene, which in turn immediately reacts with the said ethers, esters, olefines and paraffines, to form various aromatic ethers, esters, ketones, ethers, esters, of the group of cyclics and acyclics, aromatic hydrocarbons, which are found between them in very intimate contact as the catalysts of the same, from one part, and from one other part, they are in very intimate contact with the catalysts matter, which is the fine powder of the metals, iron, zinc, copper and nickel, and the final products are my synthetic rubber and my new synthetic by-products in liquid form, which are of some importance in the paint and lacquer industry,—such as solvents. However, it is to be understood, that this invention is not to be limited by this theory, but that any product resulting from the above process is intended to be covered. The metal powder of the iron, copper, zinc and nickel in the above conditions, are the catalysts in the above all processes for the receiving of my synthetic rubber, together with my new synthetic by-products.

Having described my invention as above, I claim:

The process for production of the synthetic rubber from the gases and distillation products, which are received from the dry distillation in the absence of air, at temperatures from 400° to 550° centigrade, and at pressure from 10 to 25 atmospheres, rising gradually and which gases and distillation products are from a mixture of (a) Vegetable matter from any kind of wood derived from any kind of tree, and
(b) Any kind of straw and stems derived from any kind of grass and plant life, which gases and distillation products, in mixture with the gases and distillation products, which are derived from the dry distillation in the absence of air, from a mixture of (c) Fusel oil,
(d) Molasses, and
(e) The skins, or coverings from potatoes, and grains, and which above gases and distillation products are mixed with the gases and distillation products from a mixture of (f) Heavy petroleum mineral oils,
(g) Heavy and the light oils, from the turpentine oil, and
(h) Heavy and the light oils, from the dry distillation of oak and any other kind of tree bearing wide leaves.

in which all above mentioned gases and distillation products, are mixed with the acetylene gas and brought into very intimate contact with the catalyst matter in the form of fine powder, selected from the group consisting of the metals iron, copper, zinc and nickel, the whole, being heated at temperatures from 295° to 400° centigrade, and at pressures from 23 to 25 atmospheres.

JAMES JOHNSON EARSHEN.
*Also known as Dimiter Ivanoff Ousheff.*